United States Patent [19]
Neumann

[11] Patent Number: 5,555,868
[45] Date of Patent: Sep. 17, 1996

[54] GAS DELIVERY SYSTEM

[75] Inventor: Barry R. Neumann, Australind, Australia

[73] Assignee: Transcom Gas Technologies Pty. Ltd., Herdsman W.A., Australia

[21] Appl. No.: 232,133

[22] PCT Filed: Oct. 23, 1992

[86] PCT No.: PCT/AU92/00575

§ 371 Date: Nov. 21, 1994

§ 102(e) Date: Nov. 21, 1994

[87] PCT Pub. No.: WO93/08399

PCT Pub. Date: Apr. 29, 1993

[30] Foreign Application Priority Data

Oct. 23, 1991 [AU] Australia ................... PK9064

[51] Int. Cl.⁶ .................................................. F02M 19/00
[52] U.S. Cl. ................................................... 123/275
[58] Field of Search ........................... 123/275, 277, 123/1 A, 3, 274, 525, 527, 575, 27 GE, 672

[56] References Cited

U.S. PATENT DOCUMENTS

| | | | |
|---|---|---|---|
| 2,723,653 | 11/1955 | Blake et al. | 123/120 |
| 2,763,248 | 9/1956 | Green et al. | 123/65 |
| 2,799,255 | 7/1957 | Gehres | 123/1 |
| 3,425,399 | 2/1969 | Ward et al. | 123/32 |
| 4,071,013 | 1/1978 | Thuren et al. | 123/277 |
| 4,638,777 | 1/1987 | Fanner et al. | 123/277 |
| 4,903,656 | 2/1990 | Nakazono et al. | 123/259 |
| 5,199,408 | 4/1993 | Wataya | 123/672 |
| 5,299,549 | 4/1994 | Schatz | 123/672 |
| 5,303,580 | 4/1994 | Schneider et al. | 123/672 |
| 5,353,763 | 10/1994 | Schatz | 123/403 |

FOREIGN PATENT DOCUMENTS

| | | | |
|---|---|---|---|
| 2427473 | 12/1979 | France | F02B 19/10 |
| 3709976 | 10/1988 | Germany | F02B 19/10 |
| 1275478 | 5/1972 | United Kingdom | 123/275 |

OTHER PUBLICATIONS

Internation Search Report, PCT Applicaton No. PCT/AU92/00575 (08 Feb. 1993).
Supplementary European Search Report, Application No. EP 92 92 2294 (26 Jul. 1994).
Patent Abstracts of Japan, vol. 12, No. 428 (M–762), 11 Nov. 1988; JP-A-63 162 922 (Yanmar Diesel Engine) 6 Jul. 1988 [abstract].
Diesel & Gas Turbine Worldwide, "New Gas Engine Combustin System for Delaval Enterprise" (1 Mar. 1986), pp. 33–34.

*Primary Examiner*—Raymond A. Nelli
*Attorney, Agent, or Firm*—Fish & Richardson P.C.

[57] ABSTRACT

A gas delivery system for gas fuelled internal combustion engines, comprising a gas fuel delivery means for delivering a controlled amount of gaseous fuel to a region adjacent a source of ignition. The gas fuel delivery means comprises first and second delivery means for delivering gaseous fuel to a pre-combustion zone and a combustion zone respectively. Gas control means control the relative proportions of gaseous fuel delivered by the first and second delivery means respectively so that combustion in the combustion zone can be achieved with minimum gaseous fuel by initiating ignition of gaseous fuel in the pre-combustion zone. Thus, the fuel/air ratio within the combustion zone can be minimized (lean burn regime) without the onset of engine misfire.

9 Claims, 3 Drawing Sheets

GAS DELIVERY SYSTEM

FIELD OF THE INVENTION

This invention relates to a gas delivery system for an internal combustion engine and more particularly, but not exclusively, to a spark ignition engine which operates on gaseous fuel. In one arrangement this invention relates to a spark ignition engine converted from a diesel fuelled or compression ignition engine. In another arrangement this invention relates to a dual fuel engine operating as a compression ignition engine. In such an engine operating in the dual fuel mode, it is common for a gaseous fuel to be mixed with the air before induction of the air into the engine whilst reducing the amount of diesel injected. In this specification the term "compression ignition engine" is intended to refer not only to an engine operating on a constant pressure, that is a diesel cycle, but also to an engine operating on a compression ignition cycle.

BACKGROUND TO THE INVENTION

When operating an engine with a gaseous fuel it is a well known practice to introduce the gaseous fuel with the inlet air to the cylinder during the air inlet stroke, thus causing a relatively homogenous mixture of gas and air during the combustion stroke. It is advantageous to reduce the fuel/air ratio to a minimum value in the combustion of gas as a fuel, as this reduces the carbon monoxide and hydrocarbon content of the exhaust and enhances fuel efficiencies. If the ratio is reduced sufficiently beyond the stoichiometric value a substantial reduction in the nitrous oxide content of the exhaust gas may also be achieved. This is commonly called a lean burn regime. With current gas engines the limiting factor in the reduction of the ratio to achieve lean burn is that which occurs when the average ratio of fuel to air is lowered to a level where the density of the fuel is such as to prevent initiation of fuel ignition, and thus the engine misfires.

SUMMARY OF THE INVENTION

The present invention was developed with a view to providing a method of gas delivery and a gas delivery system for a gas fuelled internal combustion engine wherein the fuel/air ratio can be minimised without the onset of misfire of the engine.

According to the present invention there is provided a gas delivery system for a gas fuelled internal combustion engine, the system comprising:

gas fuel delivery means for delivering a controlled amount of gaseous fuel to a region adjacent a source of ignition, said region comprising a pre-combustion zone located in a separate pre-combustion chamber which is located in immediate proximity to said ignition source and which is in direct communication through an orifice with a combustion zone located in a cylinder of the engine, said gas fuel delivery means comprising first and second gas delivery lines for delivering a controlled amount of gaseous fuel to said pre-combustion zone and combustion zone respectively from a common gas injector, and further comprising gas control means for controlling the relative proportions of gaseous fuel delivered by said first and second delivery means respectively whereby, in use, combustion in said combustion zone can be achieved with minimum gaseous fuel by initiating ignition of gaseous fuel in said pre-combustion zone.

In this specification the pre-combustion zone is that zone within which it is desirous to initiate the combustion process, and the combustion zone is that region to which the resultant effects of gaseous fuel ignition in the pre-combustion zone are directed to achieve combustion of the remaining gaseous fuel.

Advantageously said gas control means comprises a gas flow valve for controlling the quantity of gaseous fuel delivered to said pre-combustion zone and/or combustion zone. More particularly, said gas flow valve may be a one way valve for controlling the quantity of gaseous fuel delivered via said first gas delivery line to said pre-combustion chamber.

Typically the relative proportions of gaseous fuel delivered by said first and second delivery means is fixed for a particular engine. The relative proportion of gaseous fuel delivered by said first delivery means may be in the range of 1 to 10 percent of the total quantity of gaseous fuel delivered to said region by said gas fuel delivery means.

In one embodiment said gas control means is provided with a first input to enable the control means to control the supply of gaseous fuel at a predetermined rate to the pre-combustion zone and/or the combustion zone in accordance with at least one operating parameter. The gas control means may be provided with a second input derived from a feedback signal indicative of the amount of gaseous fuel injected into the pre-combustion and combustion zones, and the control means being adapted to adjust the supply of gaseous fuel whilst still responding to that signal by the first input.

In one embodiment the gas fuel delivery means may include continuous flow valves and the gas control means controls the proportion of gaseous fuel being delivered to the pre-combustion zone and the combustion zone respectively, as well as the total quantity of gas being supplied over time to the engine as a whole. In another embodiment the gas fuel delivery means may include incremental flow valves.

In relation to the previously mentioned embodiments, said at least one operating parameter of the engine may comprise the engine speed, or the position of the speed control (that is, the throttle) of the engine, alone or in combination with the engine speed. Further examples of said at least one operating parameter of the engine may include singularly or in conjunction with any one or more of the following parameters: air supply temperature; air supply pressure; gas supply temperature; gas supply pressure; engine phase; dynamic engine mode determination; and, battery voltage.

In relation to the previously mentioned embodiments, in one embodiment the feedback signal is derived from a measurement directly or indirectly of the exhaust gas contents of the engine for the presence of carbon monoxides, hydrocarbons, nitrous oxides or other such unwanted emissions. One such measurement may be derived from a commonly available lambda sensor which monitors the oxygen content of the exhaust gas stream. In a still further embodiment instead of a measurement of the exhaust gas contents a feedback signal is derived from a measurement of the onset of misfire in the engine either indirectly or directly.

Optimal control of the relative proportions and quantity of the flow of gaseous fuel to the pre-combustion zone and the combustion zone can thus be determined, in conjunction with test bed testing to give good ignition with the minimum amount of gaseous fuel. After initial calibration, it is not normally necessary to re-calibrate the engine. It will be appreciated that as the engine is used, the amount of gaseous fuel fed to the engine by the gas delivery system may be varied. By providing a feed-back signal as described, it may be assured that the amount of fuel delivered for the given operating conditions of the engine is optimised.

According to another aspect of the present invention there is provided a method of delivering gas for a gas fuelled internal combustion engine, the method comprising:

delivering a controlled amount of gaseous fuel to a region adjacent a source of ignition, said region comprising a pre-combustion zone and a combustion zone in communication with each other;

controlling the relative proportions of gaseous fuel delivered to said pre-combustion zone and combustion zone respectively whereby, in use, combustion in said combustion zone can be achieved with minimum gaseous fuel by initiating ignition of gaseous fuel in said pre-combustion zone.

Preferably, the method further comprises delivering a controlled amount of air to the combustion zone to maintain a minimum air to fuel ratio in said combustion zone, some of the air/fuel mixture in said combustion zone being communicated to said pre-combustion zone during initiation of ignition of gaseous fuel in said pre-combustion zone.

Typically the method also includes controlling the total volume of gaseous fuel delivered to the engine over time.

BRIEF DESCRIPTION OF THE DRAWINGS

In order to facilitate a better understanding of the nature of the invention, several embodiments of the gas delivery system will now be described in detail, by way of example only, with reference to the accompanying drawings in which.

DETAILED DESCRIPTION OF PREFERRED EMBODIMENTS

Figure 1:
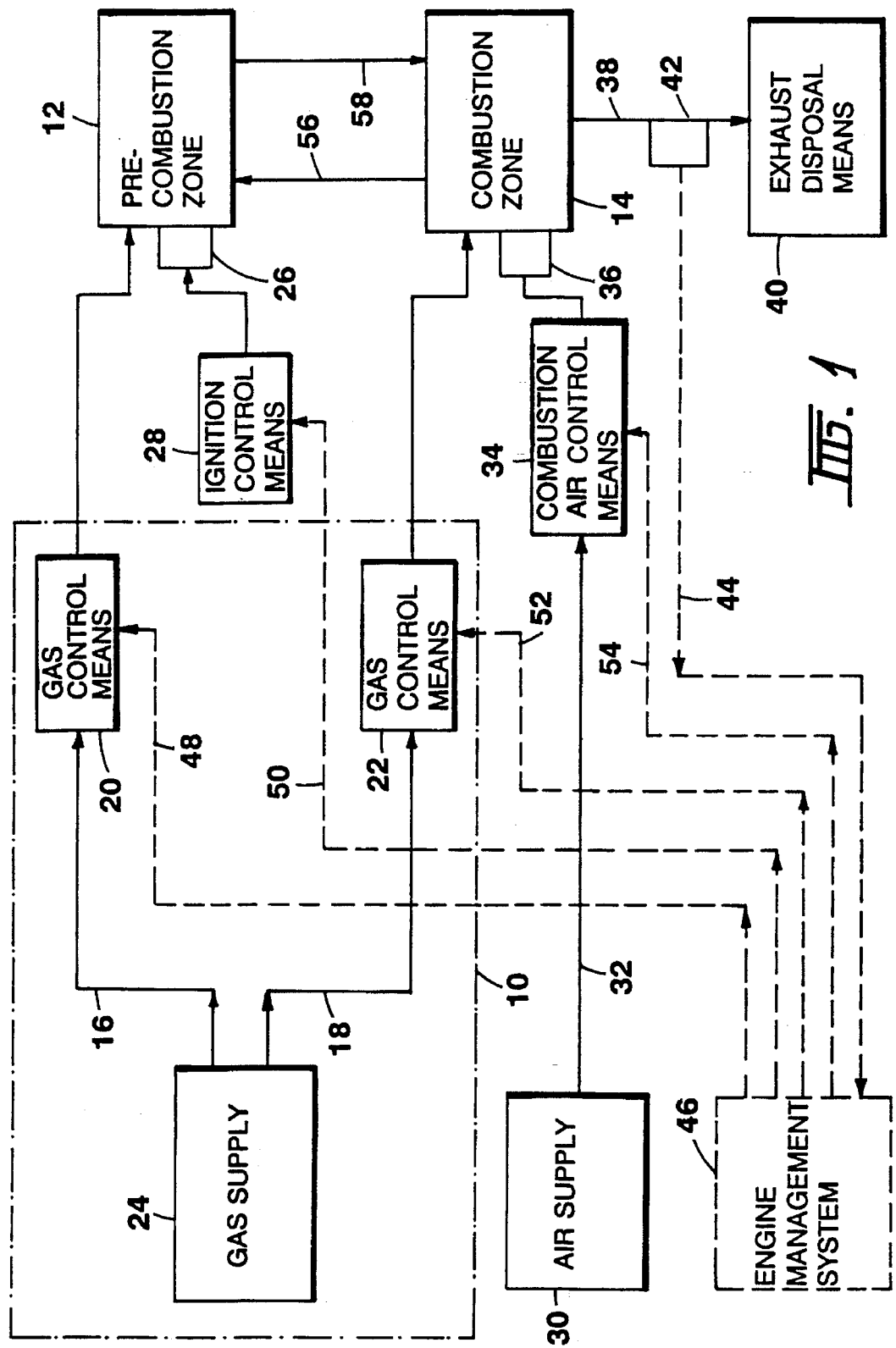
FIG. 1 is a functional block diagram of one embodiment of a gas delivery system according to the invention.

The gas delivery system illustrated in FIG. 1 for a gas fuelled-internal combustion engine (not shown) comprises gas fuel delivery means 10 for delivering a controlled amount of gaseous fuel to a region adjacent a source of ignition in the engine. This region in the engine comprises a pre-combustion zone 12 and a combustion zone 14 in communication with each other. The gas fuel delivery means 10 comprises first and second delivery means 16, 18 for delivering gaseous fuel to the pre-combustion zone 12 and the combustion zone 14 respectively, and further comprises gas control means 20, 22 for controlling the relative proportions of gaseous fuel delivered by said first and second delivery means 16, 18 respectively. The first and second delivery means 16, 18 deliver gaseous fuel from gas supply 24, and may take the form of, for example, gas supply lines. The pre-combustion gas control means 20 and combustion gas control means 22 may take the form of, for example, gaseous fuel injectors.

In this embodiment, the pre-combustion zone 12 is located in immediate proximity to the ignition source 26 which may be, for example, a spark plug, to facilitate ignition of gaseous fuel in the pre-combustion zone 12. The ignition source 26 is under the control of ignition control means 28.

Air is delivered to the combustion zone 14 from air supply 30 via air delivery means 32 and combustion air control means 34. In this embodiment, air is not delivered directly to the pre-combustion zone 12. Combustion air control means controls the quantity, temperature and pressure of combustion air prior to delivery to the combustion zone 14 via combustion air delivery means 36, which is commonly an engine manifold and inlet valve system. The products of combustion exit the engine from the combustion zone 14 via an exhaust delivery system 38, which commonly takes the form of an exhaust valve system and manifold system to an exhaust disposal means 40. An exhaust emissions analyser 42 analyses the exhaust emissions and generates a signal which is transmitted via signal delivery line 44 to an Engine Management System (EMS) 46.

The EMS 46 provides overall management of the engine operation and both monitors and supervises the pre-combustion gas control means 20, ignition control means 28, combustion gas control lines 22 and combustion air control means 34 via signal delivery lines 48, 50, 52 and 54 respectively. The signal delivery means 44, 48, 50, 52 and 54 may take the form of, for example, electrical cables, optical fibres or any other suitable signal transmission medium. The EMS 46 may also monitor and/or supervise the control of other operating parameters of the engine such as engine speed, position of the throttle, engine phase, dynamic engine load and battery voltage. Each of these operating parameters may have some bearing on the ultimate control of the gas delivery system described above, however they have been omitted from FIG. 1 for clarity sake. The exhaust emissions analyser 42 provides a feedback signal to the EMS 46 and is derived from a measurement directly or indirectly of the exhaust gas contents of the engine for the presence of carbon monoxides, hydrocarbons, nitrous oxides or other undesirable emissions. Such emissions give an indication of the extent and degree of combustion of gaseous fuel occurring within the engine and may be used by the EMS 46 to adjust the relative proportions of gaseous fuel delivered to the pre-combustion zone 12 and/or the combustion zone 14, or the total quantity of gas over time being supplied to the engine.

As noted above, combustion air is delivered directly to the combustion zone 14 only, however, during a compression stroke of the engine some air is communicated from the combustion zone 14 to the pre-combustion zone 12 via pre-combustion air supply path 56. In practice, pre-combustion zone 12 may be located in a separate pre-combustion chamber which is in direct communication through an orifice with a cylinder of the engine, the combustion zone 14 being located in the cylinder above the piston. According to the present invention, during operation of the engine, the ignition source 26 is employed to initiate ignition of gaseous fuel in the pre-combustion zone 12 where a relatively rich fuel to air ratio is present. Indeed, the ratio of fuel to air in the pre-combustion zone is selected so that ignition of the gaseous fuel is a certainty. The path of the resultant gases from the ignition of gaseous fuel in pre-combustion zone 12 to the combustion zone 14 is shown as 58, and in practice would be through the same orifice between the pre-combustion chamber and the engine cylinder. The volume of the pre-combustion zone 12 is designed to provide enough chemical reaction via the path 58 of the resultant gases from the pre-combustion zone 12 to the combustion zone 14, to cause ignition of the gaseous fuel and air present in the combustion zone 14, which has a lean fuel to air ratio. Thus, combustion in the combustion zone 14 can be achieved with minimum gaseous fuel by initiating ignition of the gaseous fuel in the pre-combustion zone 12 in the manner described above.

Figure 2:
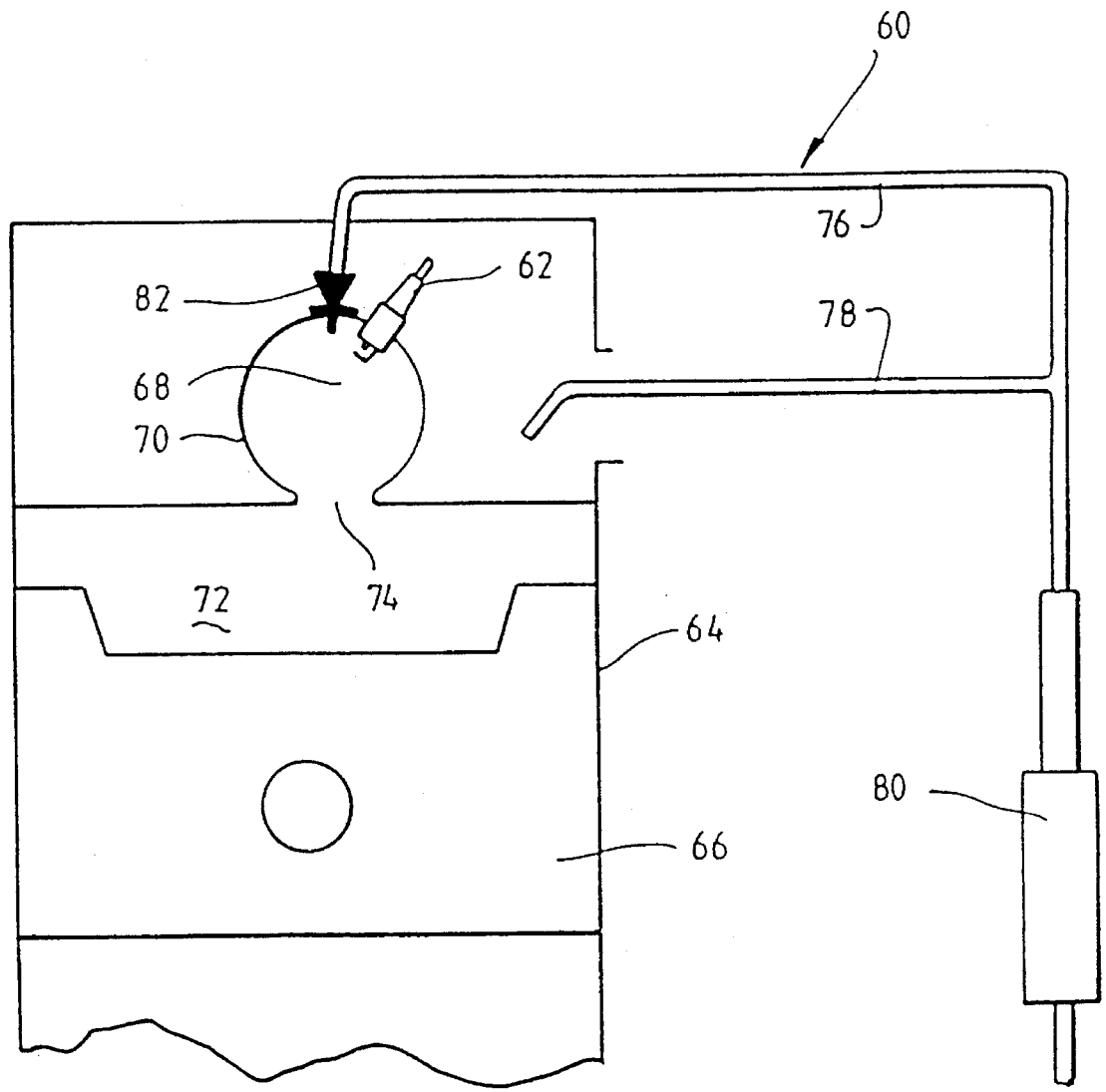
FIG. 2 is a schematic diagram of a second embodiment of a gas delivery system according to the invention; and, FIG. 3 is a section view through the cylinder head of an internal combustion engine illustrating an embodiment of a gas delivery system similar to that of FIG. 2.

In FIG. 2 a second embodiment of the gas delivery system according to the invention is illustrated schematically, and comprises gas fuel delivery means 60 for delivering a controlled amount of gaseous fuel to a region adjacent a source 62 of ignition, for example, a spark plug in the engine. In FIG. 2 only one cylinder 64 of the engine is illustrated showing a piston 66 near the top of its compression stroke. The region adjacent the ignition source 62 comprises a pre-combustion zone 68 located within a pre-combustion chamber 70 and a combustion zone 72 located within the cylinder 64 above the piston 66. The pre-combustion chamber 70 is in direct communication through an orifice 74 with the cylinder 64. The gas fuel delivery means 60 comprises first and second gas delivery lines 76, 78 for delivering gaseous fuel to the pre-combustion zone 68 and combustion zone 72 respectively. The gas delivery lines 76, 78 are supplied with gaseous fuel from a single solenoid actuated gas injector 80.

The gas fuel delivery means 60 further comprises gas control means in the form of a gas flow valve 52 for controlling the relative proportions of gaseous fuel delivered by the first and second delivery lines 76, 78 respectively. In this embodiment, the gas flow valve 82 is a non-return or one way valve which opens when the pressure within the pre-combustion chamber 70 is lower than the pressure within the gas delivery line 76, but which closes when the pressure within the pre-combustion chamber 70 exceeds the pressure within the gas delivery line 76. Hence, during a downward stroke of piston 66 one way valve 82 allows the flow of gaseous fuel from the delivery line 76 into the pre-combustion chamber 70, however during a compression stroke of the piston 66 the one way valve 82 closes to cue off the flow of gaseous fuel into the pre-combustion chamber 70. One way valve 82 also isolates the gas delivery line 76 from the gases produced as a result of combustion in the pre-combustion zone 68 and combustion zone 72.

The relative proportions of gaseous fuel delivered to the pre-combustion zone 68 and the combustion zone 72 is largely controlled by the size of an aperture provided within the one way valve 82 in its open condition. Typically, the size of the aperture in one way valve 82 is selected so that between 1 percent to 10 percent of the gaseous fuel supplied from the gas injector 80 passes through the gas delivery line 76 to the pre-combustion zone 68, and the remainder of the gaseous fuel is delivered by gas delivery line 78 to the combustion zone 72 within cylinder 64. Typically, the gas delivery line 78 delivers gas to the combustion zone 72 via the engine manifold and inlet valve system. In this embodiment, the one way valve 82 is selected so that 4 percent of the gaseous fuel from the common injector 80 is delivered to the pre-combustion zone 68, however the exact relative proportions of gaseous fuel delivered to the pre-combustion zone 68 and combustion zone 72 respectively will depend on the operating characteristics of the particular engine. From the above description, it will be apparent that the relative proportions of gaseous fuel delivered by the first and second gas delivery lines 76, 78 is fixed for this particular engine, as determined by the size of the aperture within one way valve 82. However, it is possible to arrange the gas fuel delivery means 60 so that the relative proportions of gaseous fuel delivered by the first and second gas delivery lines 76, 78 can be varied, by for example, supplying gaseous fuel to the delivery lines 76, 78 from separate gas injectors. The amount of gaseous fuel delivered by the gas injectors to the respective delivery lines 76, 78 could then be varied, for example, under the control of an engine management system.

The relative proportions of gaseous fuel delivered to the pre-combustion chamber and the cylinder for a particular engine can be determined as follows. The objective is to achieve a gas/air ratio in the pre-combustion chamber (PCC) which will ignite easily from a spark plug. In one embodiment, natural gas is used as the gaseous fuel. Natural gas is composed mainly of methane and has a stoichiometric gas/air ratio of 0.095 (9.5%). Ignition can still be achieved within the range of approximately 6.0 to 15.0% with a PCC, however most reliable ignition is achieved at near stoichiometric conditions.

There are many variables which contribute to the overall determination of the desired quantity of gas that should be diverted to the PCC. To facilitate the determination, certain variables were fixed and the resultant relationship of gas/air ratio in the PCC as a function of spark advance angle, and total gas quantity injected as a volume percentage of the total cylinder volume was calculated. The compression ratio is fixed at a value determined by the mechanical and thermodynamic considerations that apply to the particular engine, due to its desired output and gas quality. A low PCC/MCC is desirable to reduce the local thermal losses of the PCC, however the variability of the gas flow control at the PCC will dictate a practical limit. The level of gas/cylinder volume is dictated by the designed maximum absolute boost pressure, compression ratio and engine output requirements.

The following definitions and formula apply:

PCVFRN=Pre-chamber volume fraction–fraction of clearance volume occupied by PCC.

PCGFRN=Pre-chamber gas fraction–fraction of gas injected into the PCC.

CR=Compression ratio. =Clearance vol+swept vol (100) Clearance vol

CV=Clearance volume =Swept vol (100) Compression ratio—1

GV=Gas volume injected by one injector

PCGV=Pre-chamber gas volume injected =GV×PCGFRN

PCV=Pre-chamber volume =CV×PCVFRN

MCGV=Main Chamber (or cylinder) gas volume =GV-PCGV

MCAV=Main chamber air volume =100-MCGV

MCGR=Main chamber gas ratio =MCGV/MCAV

THETA=Spark advance angle (0–1.57 Radians)

$$CRI = \text{Instantaneous compression ratio}$$
$$= \frac{(100 + CV)}{(CV + 50 \times [1\text{-cos THETA}]}$$

$$PCGR = \text{Pre-chamber gas ratio}$$
$$= \frac{PCGV + (CRI\text{-}1) \times MCGR \times PCV}{(CRI\text{-}1) \times (1\text{-}MCGR) \times PCV}$$

A number of iterations can be performed by varying the PCC/MCC gas ratio until near stoichiometric conditions are achieved for the complete range of envisaged spark advance settings. In one embodiment this process indicated that a PCGFRN of 0.04 (4%) achieved near stoichiometric conditions over a range of spark advance settings (THETA) of 0.0 to 0.5236 radians. PCVFRN was set at 0.08, CR at 12.5 and CV of 8.6956512 (cylinder of volume size 100 units).

The operation of the gas delivery system illustrated in FIG. 2 is similar to that of the system illustrated in FIG. 1. During the air inlet stroke of piston 66 a mixture of gaseous fuel and air are delivered to the combustion zone 72, while simultaneously gaseous fuel only is delivered to the pre-combustion zone 68 via one way valve 82. During a compression stroke of the piston 66 some of the air fuel mixture within combustion zone 72 communicates into pre-combustion chamber 70 via orifice 74, and ignition of gaseous fuel is initiated within the pre-combustion zone 68 by ignition source 62. By this stage, one way valve 82 has closed. Due to the relatively rich fuel to air ratio within pre-combustion zone 68 ignition can be readily achieved and a chemical reaction occurs via the path of the resultant gases through orifice 74 from the pre-combustion zone 68 to the combustion zone 126 to produce ignition of the lean gaseous fuel/air mixture in the combustion zone 72. Hence, the gas fuelled internal combustion engine can be operated within a lean burn regime without fear of engine misfire.

Figure 3:
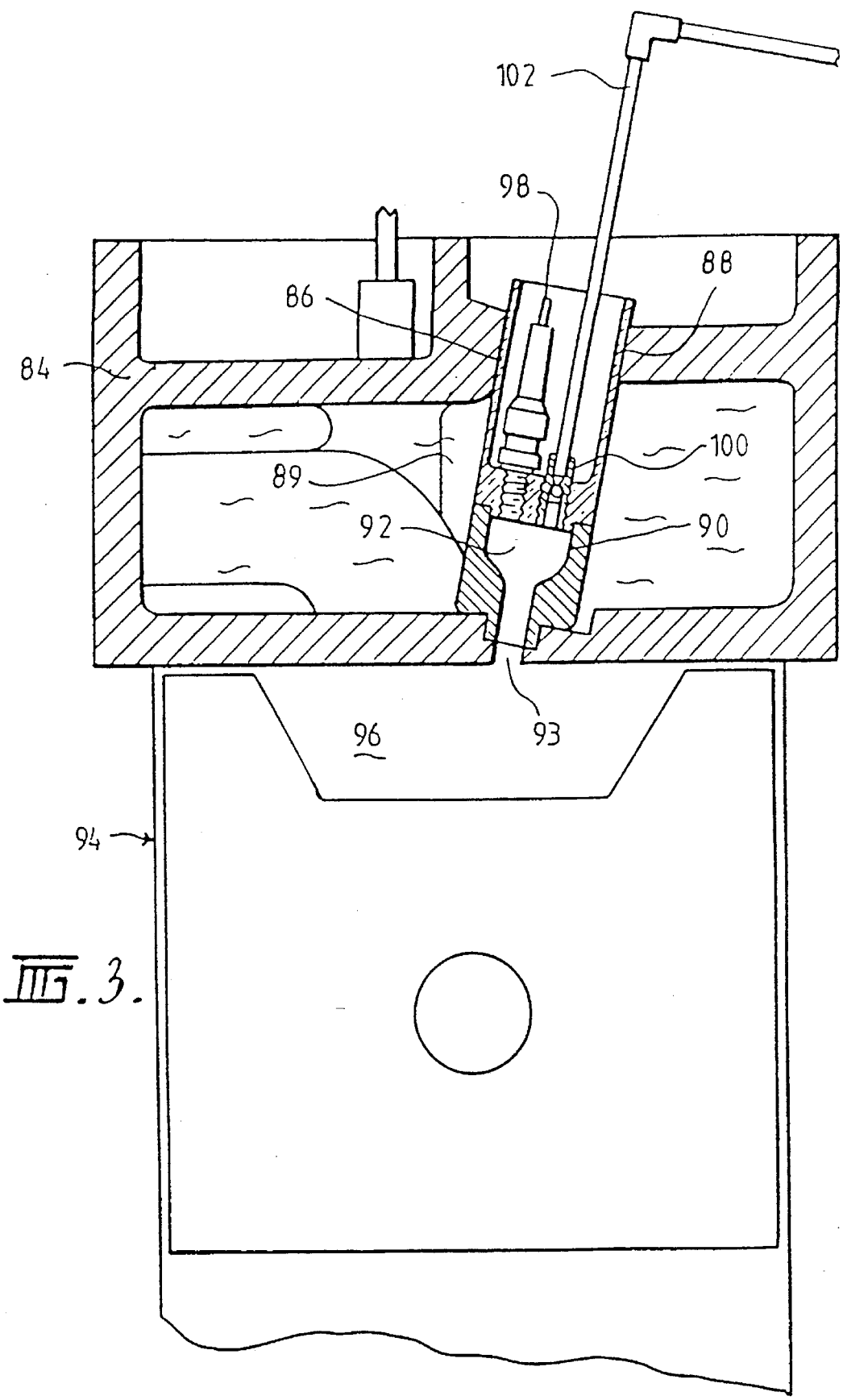

In FIG. 3 the cylinder head 84 of a compression ignition engine is illustrated in section view. The compression ignition engine of FIG. 3 has been converted to a gas fuelled, spark ignition engine, and incorporates an embodiment of a gas delivery system according to the invention, which is similar to that of FIG. 2. A casing 86 is fixed within a bore 88 provided in the cylinder head 84, so that cooling water 89 circulating within the cylinder head also cools the casing 86. Casing 86 defines a pre-combustion chamber 90 therein, and is manufactured from a material having a high thermal conductivity so that some of the heat generated within the pre-combustion chamber 90 is conducted through the walls of the casing 86 to the cooling water 89. The pre-combustion chamber 90 defines a pre-combustion zone 92 therein, and is in direct communication with a cylinder 94 of the engine, within which a combustion zone 96 is located.

Casing 86 also houses therein an ignition source 98 (spark plug), and a one way valve 100. Gaseous fuel is delivered to the one way valve 100 via a gas delivery line 102, similar to that of FIG. 2.

The operation of the gas delivery system of FIG. 3 is similar to that of FIG. 2, and will not be described again in detail here. The one way valve 100 controls the relative proportions of gaseous fuel delivered to the pre-combustion zone 92 and combustion zone 96, via respective gas delivery lines and a common gas injector (not illustrated). The combustion process is initiated by spark plug 98 within the pre-combustion zone 92, and the resultant effects of gaseous fuel ignition in the pre-combustion zone 92 are directed via orifice 93 to the combustion zone 96 to achieve combustion of the remaining gaseous-fuel.

Obviously, the arrangement of the pre-combustion chamber 90 within the cylinder head 84 of the engine may vary considerably from that illustrated in FIG. 3 depending on the type of engine, particularly where the pre-combustion chamber is incorporated within the cylinder head at the time of manufacture of the engine, rather than as a result of a conversion of a compression ignition engine to a spark ignition gas fuelled or dual fuel engine. In a dual fuel engine, the gas delivery system according to the invention can also be used to deliver pilot fuel to the engine.

It will be apparent from the above description that the gas delivery system according to the invention has significant advantages over prior art systems which rely on a gas carburettor to supply the appropriate air/fuel mixture to the engine. The relative proportions of gaseous fuel delivered to the pre-combustion zone and the combustion zone can be accurately controlled so that combustion in the combustion zone can be achieved with minimum gaseous fuel without fear of engine misfire. Combustion in the pre-combustion zone produces a flame front and radical molecules which will easily and quickly ignite the relatively lean mixture in the combustion zone, thus resulting in high engine efficiencies, i.e., more combustion close to piston top dead centre (TDC) and lower losses due to dissociation and thermal considerations, which both increase rapidly as the peak cycle temperature increases. Furthermore, emissions of carbon monoxide, hydrocarbons and nitrous oxides can be lowered due to the overall lean combustion process. The simplicity and elegance of the gas delivery system according to the invention enables it to be readily incorporated in a conventional engine and/or a conventional engine can be easily converted to a gas fuelled engine.

Furthermore, now that preferred embodiments of the gas delivery system have been described in detail, it will be obvious to persons skilled in the mechanical arts, that numerous modifications and variations may be made to the illustrated embodiments, in addition to those already described, without departing from the basic inventive concepts. For example, the relative proportions of gaseous fuel delivered to the pre-combustion zone and the combustion zone respectively, may be determined by the relative diameters of the respective gas delivery lines. All such variations and modifications are to be considered within the scope of the present invention, the nature of which is to be determined from the foregoing description and the appended claims.

The claims defining the invention are as follows:

1. A gas delivery system for a gas fuelled internal combustion engine, the system comprising:

gas fuel delivery means for delivering a controlled amount of gaseous fuel to a region adjacent a source of ignition, said region comprising a pre-combustion zone located in a separate pre-combustion chamber which is located in immediate proximity to said ignition source and which is in direct communication through an orifice with a combustion zone located in a cylinder of the engine, said gas fuel delivery means comprising:

a single gas injector which is common to said pre-combustion zone and said combustion zone for said cylinder of the engine;

a first gas delivery line for delivering a controlled amount of gaseous fuel to said pre-combustion zone and a second gas delivery line for delivering a controlled amount of gaseous fuel to said combustion zone, both from said single gas injector common to said pre-combustion zone and said combustion zone for said cylinder, and gas control means for controlling the relative proportions of gaseous fuel delivered by said first gas delivery line and said second gas delivery line from said single gas injector common to said pre-combustion zone and said combustion zone for said cylinder, whereby, in use, combustion in said combustion zone can be achieved with minimum gaseous fuel by initiating ignition of gaseous fuel in said pre-combustion zone.

2. A gas delivery system as claimed in claim 1, wherein said gas control means comprises a gas flow valve for controlling the quantity of gaseous fuel delivered to said pre-combustion zone.

3. A gas delivery system as claimed in claim 2, wherein said gas flow valve is a one way valve for controlling the quantity of gaseous fuel delivered via said first gas delivery line to said pre-combustion zone.

4. A gas delivery system as claimed in claim 1, wherein the relative proportions of gaseous fuel delivered by said first gas delivery line and by said second gas delivery line is fixed for a particular engine.

5. A gas delivery system as claimed in claim 4, wherein the relative proportion of gaseous fuel delivered by said first gas delivery line may be in the range of 1 to 10 percent of the total quantity of gaseous fuel delivered to said region by said gas fuel delivery means.

6. A gas delivery system as claimed in claim 3, wherein said ignition source and one way valve are housed in a casing mounted above said cylinder in a cylinder head of the engine, and wherein said pre-combustion chamber is defined by the casing and is manufactured from a material having a thermal conductivity adapted to allow heat generated within the pre-combustion chamber to be conducted through a wall of the casing to cooling water in the cylinder head.

7. A gas delivery system as claimed in claim 3, wherein gaseous fuel only is delivered via said first gas delivery line to said pre-combustion zone, and wherein during a compression stroke some of an air-fuel mixture within said combustion zone communicates into said pre-combustion zone via said orifice so that ignition of gaseous fuel can be initiated within said pre-combustion zone by said ignition source.

8. A gas delivery system as claimed in claim 1, wherein said gas control means comprises a gas flow valve for controlling the quantity of gaseous fuel delivered to said combustion zone.

9. A gas delivery system as claimed in claim 1, wherein said gas control means comprises a gas flow valve for controlling the quantity of gaseous fuel delivered to said pre-combustion zone and to said combustion zone.

* * * * *

UNITED STATES PATENT AND TRADEMARK OFFICE
CERTIFICATE OF CORRECTION

PATENT NO. : 5,555,868

DATED : September 17, 1996

INVENTOR(S) : Barry R. Neumann

It is certified that error appears in the above-identified patent and that said Letters Patent is hereby corrected as shown below:

Col. 3, line 45, "fuelled-internal" should be --fuelled internal--.

Col. 5, line 22, "52" should be --82--.

Col. 7, line 47, "gaseous-fuel" should be --gaseous fuel--.

Signed and Sealed this

Sixteenth Day of December, 1997

Attest:

BRUCE LEHMAN

Attesting Officer

Commissioner of Patents and Trademarks